United States Patent [19]

Steinthal

[11] 4,052,103
[45] Oct. 4, 1977

[54] CENTRAL ARM REST FOR A COMPLEX OF AT LEAST TWO SEATS

[75] Inventor: Pierre T. Steinthal, Massy, France

[73] Assignee: Compagnie Nationale Air France, France

[21] Appl. No.: 686,371

[22] Filed: May 14, 1976

[30] Foreign Application Priority Data

July 22, 1975 France ............................... 75.22763

[51] Int. Cl.² .................................................. A47C 7/54
[52] U.S. Cl. ...................................... 297/417; 297/113
[58] Field of Search ........................ 297/113, 115–117, 297/162, 417

[56] References Cited

U.S. PATENT DOCUMENTS

| 2,278,749 | 4/1942 | Todd | 297/113 |
| 3,675,968 | 7/1972 | Douglas | 297/162 |
| 3,880,466 | 4/1975 | Brennen | 297/417 |
| 3,951,452 | 4/1976 | Harder | 297/417 |

Primary Examiner—James C. Mitchell
Attorney, Agent, or Firm—Keil, Thompson & Shurtleff

[57] ABSTRACT

An arm rest is provided which can be lifted by rotation around a transverse shaft so as to completely disappear between two adjacent seats, said arm rest having a rear element articulated on a transverse shaft and a forward interior element which is a prolongation of said rear element and which is articulated on the latter for rotary movement through a pivot the axis of which is longitudinal.

12 Claims, 11 Drawing Figures

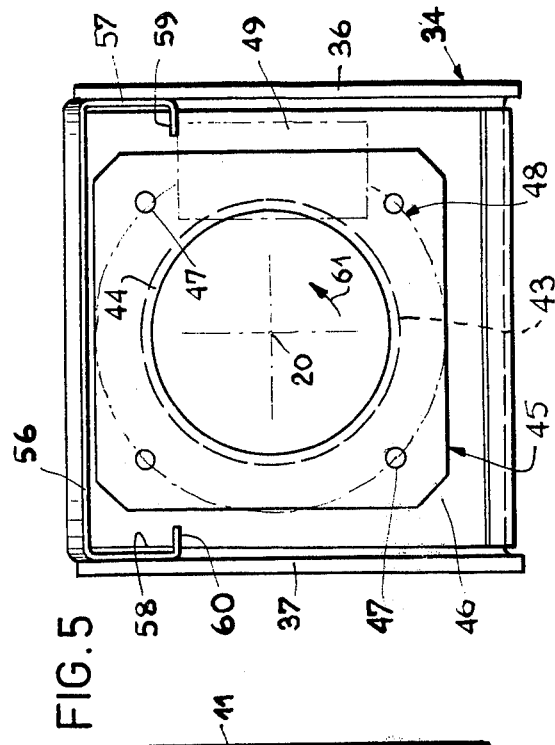
FIG.5
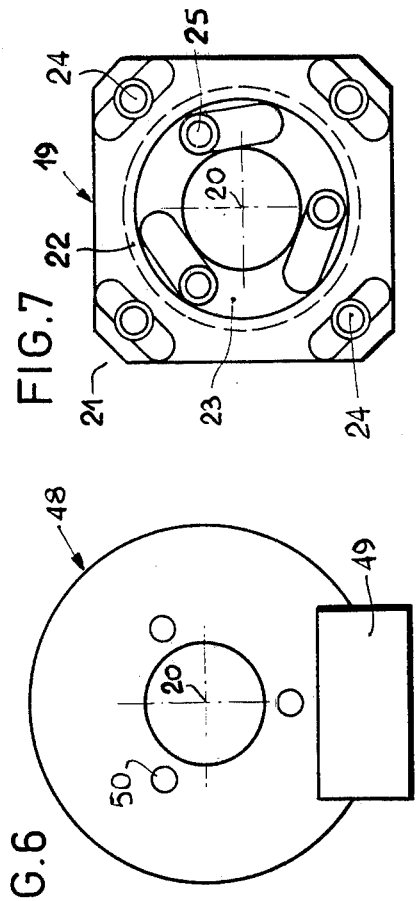
FIG.7
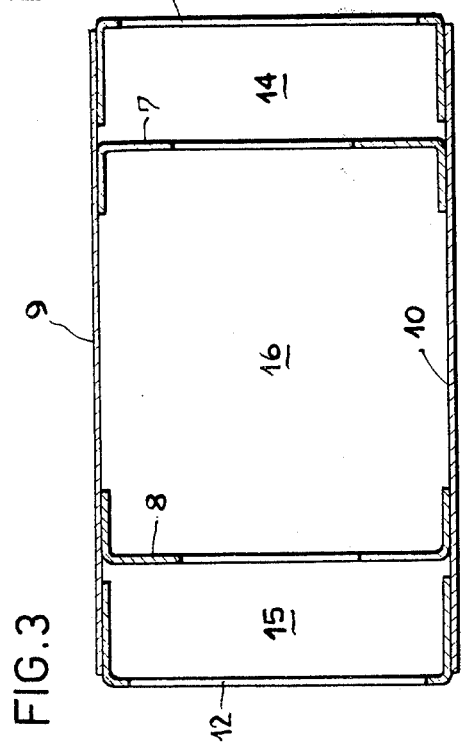
FIG.6
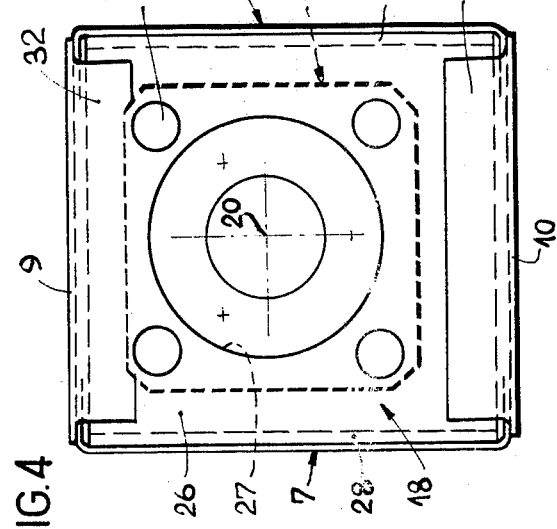
FIG.3
FIG.4

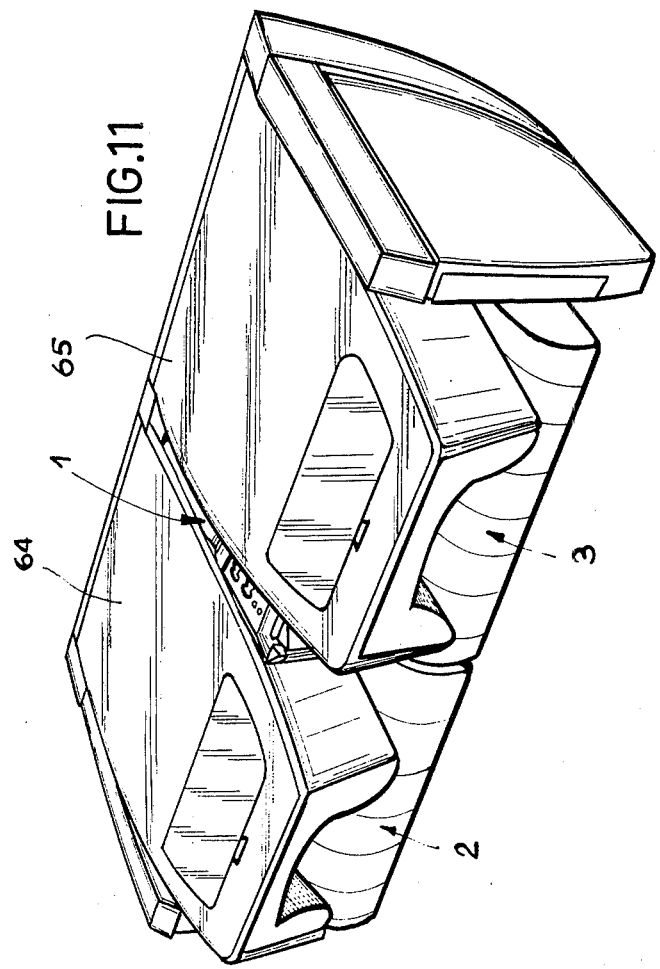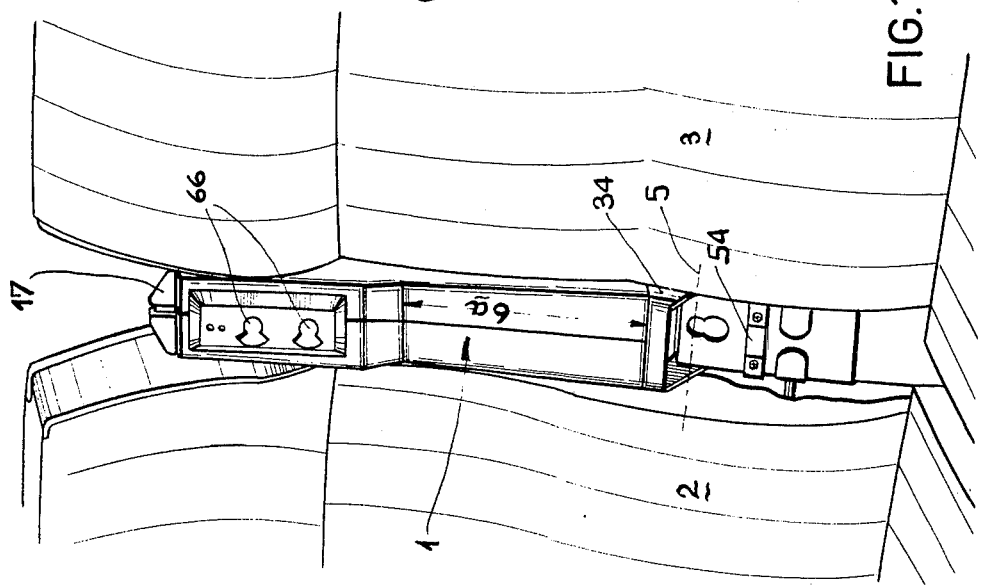

CENTRAL ARM REST FOR A COMPLEX OF AT LEAST TWO SEATS

The present invention relates to a central arm rest for a complex of at least two seats. It is especially meant for transportation vehicles, and more specifically for airplanes. It is well known that in order to improve the comfort of the passengers installed in an airplane or in a railroad car, on the seat of a multiseat complex, it is a classical pattern to make each central arm rest of that multiseat complex such that it can be raised, by rotation around a transverse shaft, fastened either to one seat or to two seats, in order to hide it between two adjacent seats of the multiseat complex.

Such an arrangement provides a number of advantages which can be enumerated in a general manner as follows: the passenger occupying a seat, the adjacent seat of which is free, either can stretch, or he can spread objects when the backs of the two seats are raised and when the central arm rest also is raised; when a seat in front of a passenger is unoccupied, said passenger can fold the back which is in front of him forward, and make it disappear between the two arm rests adjacent to it, in order to place documents on the top of the folded-down back, or in order to stretch by placing his legs on it; when each central arm rest has been raised, the free space is increased in case of emergency evacuation; when one or several back rests have been brought forward down next to arm rests which can be lifted, it is possible to install a stretcher, or to fasten freight on the tops of them; finally, in the same situation, it is obvious that it is easier to stack the seats in piles, prior to their being installed into the transportation vehicles.

It is known, moreover, regardless of the transportation vehicle, that manufacturers are forced more and more to make multiseat complexes, the seats of which are as close to one another as possible in order to reduce to a minimum losses of useful volume. When two adjacent seats are brought as close together as possible the central arm rest which borders on both seats must be very narrow in order, when in raised position, to disappear between said seats.

It is evident that such an arrangement is incompatible with the comfort of the passengers which requires that the arm rests be as wide as possible to insure greater comfort and especially to make it possible for two neighboring passengers each to lean his elbow or his forearm on the central arm rest.

The purpose of the present invention is to eliminate the aforementioned drawback by providing two adjacent compatible seats very close to each other and by providing a very wide central arm rest.

Consequently the present invention has as its object the provision of a new article of manufacture comprising a central arm rest which can be lifted by rotation around a transverse shaft fixed to one seat or two seats of a multiseat complex so as to completely disappear between the two adjacent seats, characterized by the fact that said arm rest consists of two fixed elements, viz., a first rear element freely articulated on the transverse shaft of the seat to permit raising of the arm rest and a second forward element which extends beyond the first element and is freely articulated on the latter by means of a longitudinal axis central pivot, the forward pivoting element of the arm rest being preferably made in the form of a quadrangular arm the width of which, when the arm is in normal position prior to pivoting, is definitely greater than its thickness. Thus, in normal position prior to pivoting the arm, the passenger enjoys complete comfort since he can place his arm on a very wide arm rest without being obstructed by his neighbor who also can rest his arm. In case one of the seats is not occupied, and to permit raising the arm rest, it is sufficient to turn the forward element of the arm rest on its pivot in order to reduce the transverse dimension and thereby facilitate its disposition and between the back rests of the seats of the multiseat complex.

According to a preferred embodiment, the rear element has a unique degree of freedom around the transverse shaft of articulation on the seats, and the forward element, fixed to said rear element at the time of said articulation, further has, relative to the rear element, a unique degree of freedom around the longitudinal pivot. The simplified construction makes it possible to have a first rotation of the forward element of the arm rest with respect to the rear element, followed by a second rotation of the whole around the transverse articulation shaft of the rear element on the seat, when the passenger wishes to raise his arm rest. All of the required maneuvers for the lifting and the disappearance of the arm rest, therefore, are obtained by means of two simplified elementary maneuvers which can very easily be performed by any passenger.

According to a preferred embodiment, the forward element of the arm rest has a cam of which at least one face, when the arm is in its normal position prior to pivoting, is located supported by a fixed lug piece on the structure of the seat, the surfaces of the cam and of the lug piece which are in contact not being contained in a vertical plane parallel to the transverse articulation shaft. This affords two advantages: (1) it is possible to position the arm rest in its normal unraised position, and (2), it prevents the forward element of the arm rest from rotating on itself, relative to the rear element, under the weight of the passenger's arm. In such case, the surfaces of the cam and of the lug piece which are in contact are contained in a plane parallel with the transverse articulation shaft, and they are slanted with respect to the vertical, by an angle of approximately 20°. Adjusting of the two pieces in contact, that is the cam and the lug piece, therefore is easily insured, and with the greatest possible precision.

The plane in which the surfaces of the cam and of the lug piece which are in contact are contained is slanted, from top to bottom, from the rear to the fore of the arm rest. This arrangement requires that the forward element of the arm rest cannot rotate around its own pivot having a longitudinal axis, except that it has been raised upward by a few degrees, and again it is assured that the forward element of the arm rest cannot rotate in an untimely manner under the sole weight of the arm of a passenger.

In an especially advantageous manner, the rear element is fitted with a small bridge, one part of which at least forms a lug piece for the cam when the forward element of the arm rest pivots by 90° relative to the rear element around its longitudinal axis. In this way the passenger has no difficulty in finding the position in which he must place the arm rest before raising it; it is sufficient for him to cause the forward element of the arm rest pivot until the cam strikes against the small bridge before simultaneously raising the two fixed elements of the arm rest. The thickness of the arm rest is at most equal to the space which separates the two adjacent seats, so that the disappearance of the central arm rest is complete.

In a specific embodiment of the invention, the rear of the forward element has a cylindrical pivot which cooperates with the cylindrical rim of a ring affixed to the fore part of the rear element. This makes it possible to center perfectly the direction of the longitudinal axis, the forward element relative to the rear element, in its raised position as well as in its lowered position. In this embodiment, the cam is mounted on the pivot to the rear of the ring, a washer being placed between the ring and the cam which is rotatable with respect to the ring. Consequently, the cam serves at the same time as a blocking member for the forward element which is mounted on the rear element of the arm rest.

The pivot is mounted on a fitting riveted on the rear part of the forward element, and the ring is mounted on a mounting articulated on a transverse shaft between the seats.

The invention is further illustrated but is not limited by the following description in conjunction with the accompanying drawings.

In the drawings:

FIG. 3 is a view in the direction of arrow III of FIG. 2, of the fore part of the forward element of said arm rest;

FIG. 4 is a view taken from line IV—IV of FIG. 2 of the rear part of the forward element, which shows a cylindrical pivot mounted on a mounting member;

FIG. 5 is a detail view of the fore part of the rear element of the arm rest taken from line IV—IV of FIG. 2;

FIG. 6 is a front view of the cam for blocking the arm rest in its normal position and in its raised position;

FIG. 7 is a detail view of the cylindrical pivot screwed on the mounting of the forward element, the view being in the direction of arrow III in FIG. 2;

FIG. 10 is a perspective view of the arm rest in its pivoted and raised position, the back rests of the adjacent seats also being raised, and FIG. 11 is a perspective view of the arm rest in its pivoted position, the arm rest being entirely hidden between the back rests of the two adjacent seats, which have been brought down forward over the seat.

Figure 1:
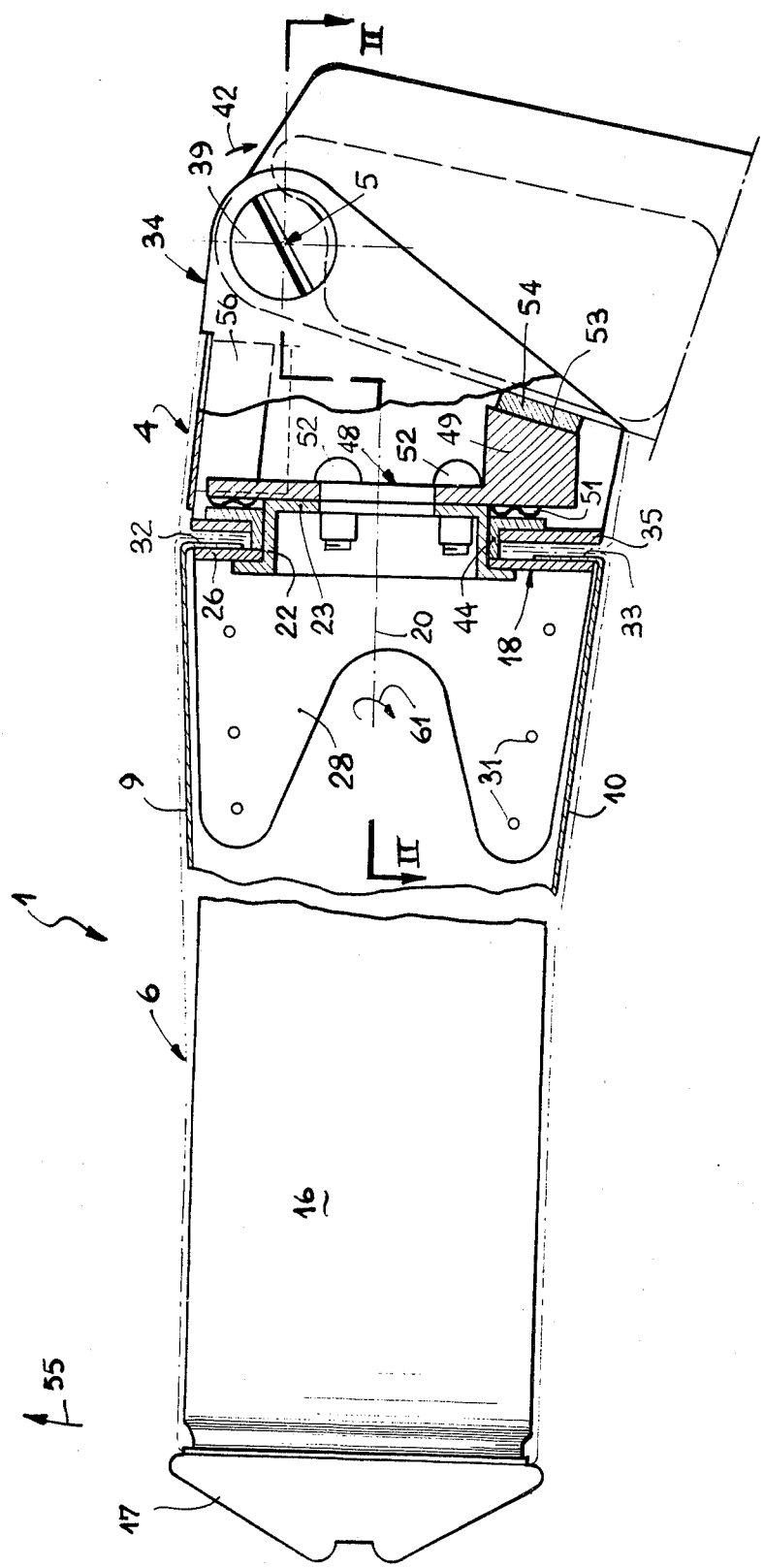
FIG. 1 is a profile view of an arm rest according to the present invention, represented in its normal position, i.e., when it is not raised.

Referring to the drawing, an arm rest generally illustrated at 1 is disposed between at least a two seat complex of adjacent side-by-side seats 2 and 3.

Essentially, arm rest 1 consists of two rigid elements, viz., a first rear element 4 freely articulated on the transverse shaft 5 of a seat 2 or 3, and a second forward element 6 disposed in the prolongation of element 4.

In its rear part 6a, the forward element 6 has a conventional width, e.g., a relatively narrow zone extends over approximately one half of the length of the arm rest, i.e., over approximately 200 millimeters. Beyond this limited width zone, the sides of the arm rest diverge uniformly and become parallel again once the width of the arm support surface in its front zone 6b is approximately double the conventional width. The length of said zone 6b is of the order of that of zone 6a, i.e., 200 millimeters.

Figure 2:
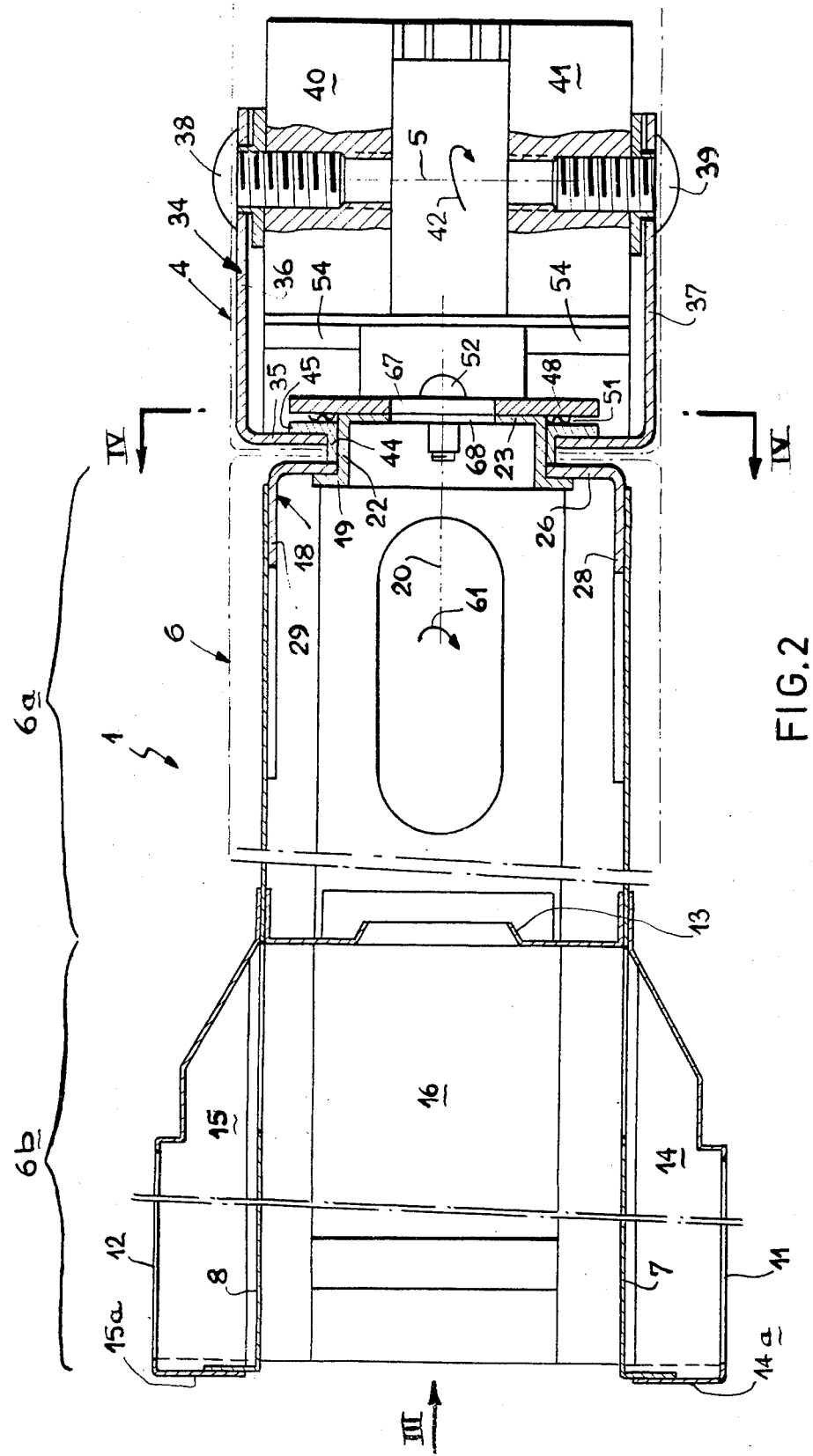
FIG. 2 is a section view taken along line II—II of FIG. 1.

The internal structure of the forward element 6 is obtained by means of welded sheet metal. A lateral right side 7, and a lateral left side 8 (FIG. 1) each in the shape of a U, are joined at the top and bottom by an upper sheet metal 9 and by a lower sheet metal 10 (FIG. 2) welded on the wings of the U's. In the fore zone 6b of the arm rest, the upper and lower sheet metal 9 and 10, respectively, are wider and cut out as indicated in FIG. 2, and are joined by means of two additional welded sheet metal pieces 11 and 12, respectively, which are U-shaped and which provide with the profiles 7 and 8, respectively, a lateral arm support 14 on the right side and a lateral arm support 15 on the left side. A bracket 13 welded to the sides 7 and 8 establishes a vertical separation wall between zones 6a and 6b and at the same time provides an internal stiffening element for the arm rest.

The U-shaped members 7 and 11 and 8 and 12 are bent toward each other in the front in order respectively to form closures 14a and 15a. Chamber 16 formed between the two areas 15 and 14 on one side and the upper and lower sheet metals 9 and 10, respectively, on the other side, is open in front to provide space for an ashtray. An ashtray 17 fits into said space with its back against bracket 13 when it is closed after use. The rear of the forward element is closed by a U-shaped member 18 on which is screwed a cylindrical pivot 19 the longitudinal axis 20 of which extends in a general direction lengthwise of the arm rest.

Cylindrical pivot 19, detailed in FIG. 7, is formed in the shape of a square plate, chamfered on each one of the corners 21. A cylindrical skirt 22 extends toward the rear of pivot 19 the end of which is a disc 23. A threaded insert or screw nut 24 is mounted near each corner of plate 19 in the front of said plate, i.e., on the side opposite the one from which skirt 22 extends. Moreover, three screwnuts 25 evenly placed at 120° from one another, are secured to disc 23 facing the walls of skirt 22.

Mounting 18 is cut out in a U-shaped profile, in a manner such that its body 26 will present a circular opening 27 for the passage of skirt 22. The space which separates the exteriors of wings 28 and 29 of mounting 18 is equal to the space which separates the interiors of the parallel sides 7 and 8.

The pivot and the mounting in the forward element of the arm rest are assembled as follows. Skirt 22 of the pivot 19 is disposed in opening 27 of mounting 18 until the plate of said pivot is brought to rest against the body of mounting 18. Four locking screws the threads of which cooperate with screwnuts 24 are inserted through the four openings 30 in the body of the mounting 18 in a position facing the screwnuts 24 and tightened. The mounting on which pivot 19 is thus affixed is then introduced through the end opening of the forward element of the arm rest between the sides 7 and 8 of the latter. The assembly is then completed by riveting wings 28, 29 at 31 on the sides 7 and 8, respectively of the arm rest. The assembly is optionally improved by folding back the ends of the upper and lower sheet metal 9 and 10, respectively at 32 and 33, on the free exteriors of the body of mounting 18.

Rear element 4 of the arm rest essentially comprises an articulation mounting 34 in the form of a U-shaped profile. The height of body 35 of said U essentially is equal to the distance which separates sheet metal 9 and 10 of the forward element. Wings 36 and 37 of mounting 34 are cut out in the shape of a trapezium, and each one of them is provided in its upper part, with an opening for the passage of shafts 38 and 39, respectively, which fix said mounting to central cross members 40 and 41, respectively, comprising one of the frames or supports of the back of a seat. Mounting 34 is freely articulated in rotation around the transverse shaft 5, as schematically represented by arrow 42.

Body portion 35 of articulation mounting 34 is provided centrally with a circular opening 43 for the passage of a ring 44 essentially formed of a cylindrical rim and of a support 45 perpendicular to the axis of said rim. Support 45 is cut out in the shape of a square each corner of which is chamfered at 46. The internal diameter of the rim of ring 44 is equal to the external diameter of skirt 22. Finally, four holes 47 are provided for the passage of screws (not shown) for securing the ring 44 on mounting 34.

When the second mounting 34 containing ring 44 is mounted on the back part of the seat, the rear element 4 of the arm rest thus obtained is associated with said forward element 6 by engaging skirt 22 of the pivot inside the cylindrical ring 44 until the outer surface of the body of first mounting 18 has been brought to rest against the top of the rim of said ring. Ring 44 is made of nylon for example, or any other material which makes it possible for skirt 22 to rotate in ring 44. It is evident that the longitudinal axis 20 is a common axis to the rim of ring 44 and to skirt 22. Moreover, said rim insures the transverse immobility of skirt 22, i.e., the sideways movement of pivot 19 and consequently the transverse immobility of any forward element of the arm rest. The longitudinal immobility of the forward element 6 on the rear element 4 is insured by cam 48 (FIG. 6) formed in the shape of a disc the rear face of which carries a base member 49. The diameter of cam 48 is approximately equal to the side of support 45 of ring 44. Cam 48 is provided with three holes 50 equally disposed on the same diameter 120° apart, so as to face the embedded screwnuts 25 under disc 23 of pivot 19. Finally, the rear face of base member 49 is in the form of a slanted plane 53, slanted from top to bottom and from the rear to the front of the arm rest.

In order to fix cam 48 inside the arm rest it is sufficient to raise the two elements 4 and 6 which constitute said arm rest causing the rear element to rotate around its shaft 5, so that it is possible to introduce said cam between the back part of the seat and the rear face of disc 23 of the pivot. Care should be taken to introduce a corrugated washer 51 between the front face of cam 48 and the rear face of the support for nylon ring 44. Then three screws 52 are placed in the smooth holes of the cam and screwed in screwnuts 23 to insure mounting of the whole complex.

It will be noted that the rear element 4 extended by forward element 6 has only a single plane of movement around its transverse shaft 5 on the seat. In addition, the forward element 6 is blocked in the transverse direction and in the longitudinal direction on rear element 4 and has, relative to said rear element, only a single plane of movement up and down but not sideways around the longitudinal pivot axis 20. At the time of the rotation of element 6 with respect to element 4, the members in contact are, on one side, ring 44 for the rear element and, on the other side, mounting 18, pivot 19 and cam 48 for the forward element. The formation of the ring of nylon and the use of the corrugated washer 51 make possible the relative rotation motions of the two elements 4 and 6 without any fear of locking.

At the level of the rear slanted face 53 of the cam base is placed on the back part of the seat a lug piece 54 made in the form of a plate which extends from member 40 to member 41.

The supporting surface of lug piece 54 is parallel with the face 53 (see FIG. 1), and it is in close contact with the latter when the arm rest is in normal position, i.e., in the non-raised position, and prior to any pivoting motion around axis 20. As the faces in contact with cam 48 and with lug piece 54 are not in a vertical plane parallel with transverse shaft 5, it will be noted that it is impossible under these conditions to cause forward element 6 of the arm rest to pivot around its longitudinal axis 20. Thus, blocking of rotation of the forward element with respect to the rear element is assured and any false untimely motion which might be caused, for example, by the weight of a passenger's arm, is prevented.

In order to unblock the aforementioned system, it is sufficient to lift upward by a few degrees, as indicated by arrow 55 (FIG. 1), the whole arm rest complex forward and rear elements together in order to release the two contacting surfaces 53, 54 and then turn the forward element 6 to cause it to pivot around shaft 20 relative to the rear element.

In addition, it may be desirable to limit the aforementioned pivoting motion, especially in order to assure the passenger that, following the pivoting motion of the forward element of the arm rest, said arm rest really is in its position of least thickness which makes possible its complete disappearance between seats 2 and 3. To that end, at right angle with base 49 of cam 48, there is placed on the articulation mounting 34 a small bridge 56 the cross section of which is C-shaped. The intermediate wings 57 and 58, respectively, are riveted on wings 36, 37 of the mounting. The end wings of the small bridge 59 and 60 (FIG. 5) respectively, are turned toward each other, and have a height sufficient to constitute a stop piece for base 49 of cam 48 during the rotation of said cam. It will be noted that if care has been taken to place the end wings of the small bridge at a height such that base 49 strikes against one of said wings when the forward element 6 has pivoted by 90° around its axis 20, and thus very precisely, as schematically represented by arrow 61, the desired blocking is easily obtained with the greatest accuracy.

After upholstering the arm rest, the latter is in the form of a quadrangular arm the width 1 of which is substantially greater than its thickness e.

Figure 8:
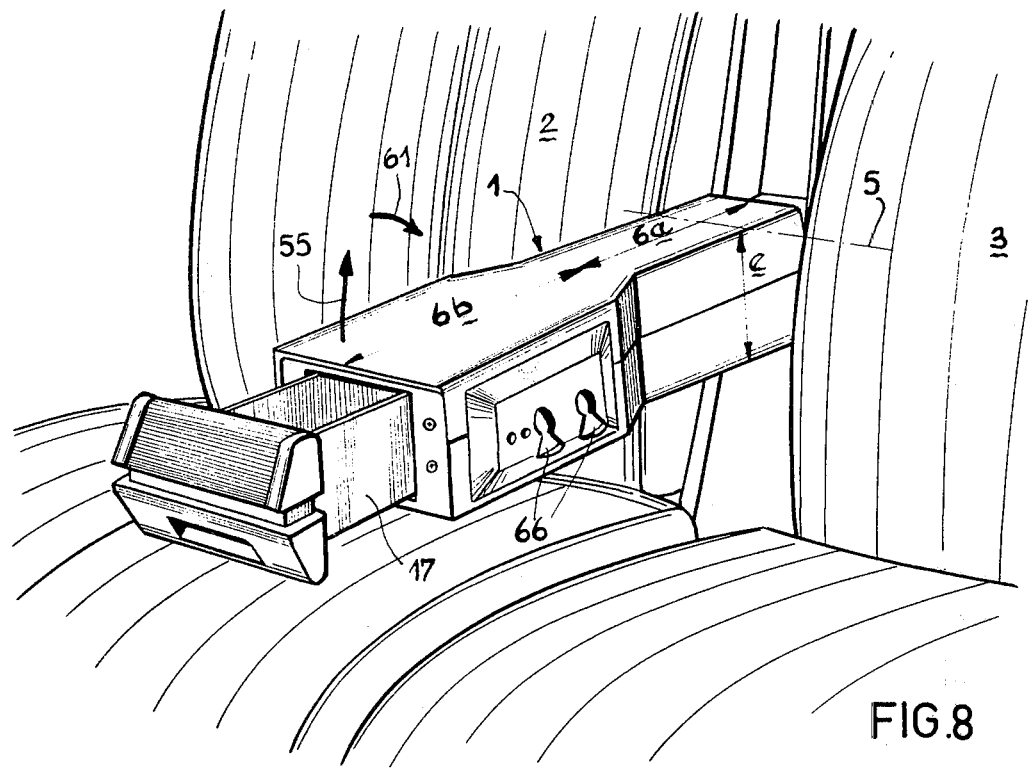
FIG. 8 is a perspective view of the arm rest in its normal position.

In its normal position represented in FIG. 8, the arm rest is as wide as possible and easily allows two neighboring passengers each to rest his fore arm. On the other hand, it is evident that the width itself prevents the total disappearance of the arm rest between the two adjacent seats 2 and 3 after the arm rest is raised.

Figure 9:
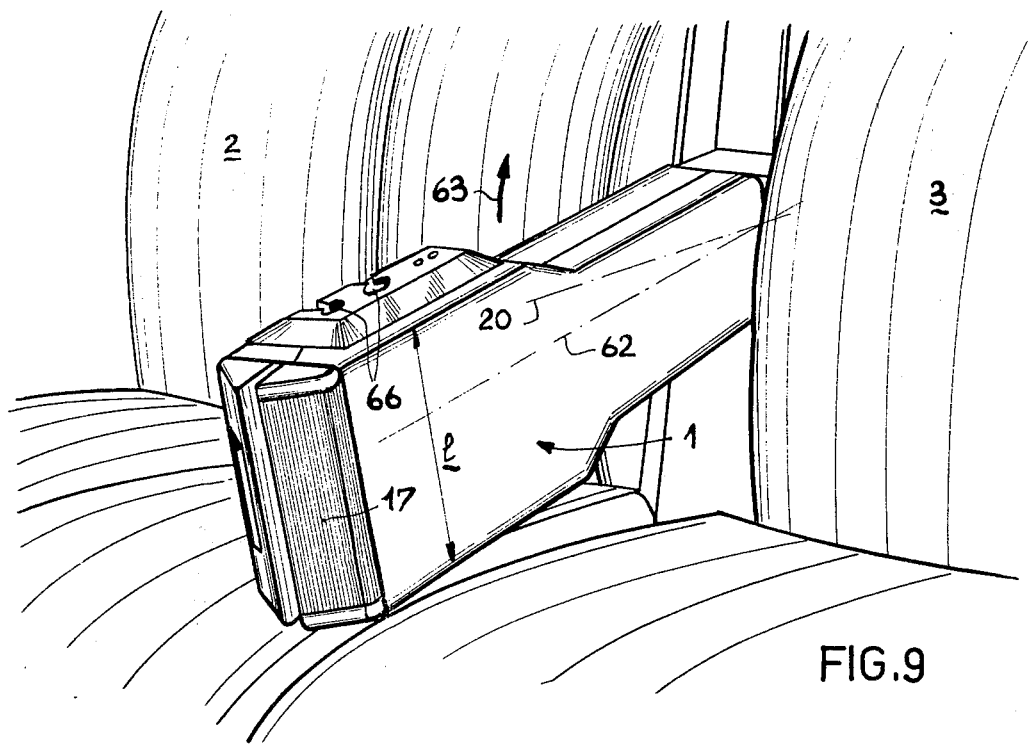
FIG. 9 represents a perspective view of the arm rest of FIG. 8, in its pivoted and unraised position.

In order to cause the arm rest to disappear between the backs 2 and 3, it is sufficient to lift the arm rest by a few degrees, as indicated by arrow 55, then to cause its forward part to pivot by 90° relative to its rear part, as shown by arrow 61. The arm rest from the original position shown in FIG. 8, changes to its pivoted position in FIG. 9 in which position its longitudinal shaft 62 is located a few degrees below the normal position of axis 20 since the active surface 53 of the cam and the active surface of the lug piece 54 no longer are in contact.

Once the arm rest has been placed in its pivoted position, it is then very easy to raise it completely as indicated by arrow 63 to fit it between the two adjacent seats (FIG. 10), or on the contrary, it is possible to cause the two backs 64 and 65 of the seats 2 and 3 to pivot forwardly to form an arrangement as shown in FIG. 11 on which it is possible to fasten freight, to install a stretcher, or more simply to stretch one's legs. It is evident that the complete disappearance of the arm rest between the backs 64 and 65 makes it possible to fold down said backs on their seats, a position which prevents any useless loss of volume inside the transportation vehicle.

It is evident that the present invention is not limited to the methods of application, nor to the methods of execution which have been mentioned, and it is possible to have several variations without departing from the scope of the invention. Especially, when it is desired to place in the arm rests outlets 66 for individual headphones which distribute, for example, musical programs or the sound corresponding to certain filmed programs, it is indispensable to bring to such outlets the corresponding wires. A duct for these wires to the articulation mounting 34 is provided without any difficulty inside the frame of the seat; beyond that it is sufficient to provide for a central hole 67 in cam 48, and for a corresponding hole 68 in disc 23 of pivot 19 in order to take the wires as far as the inside of the forward element of the arm rest. A central opening in bracket 13 and openings in sides 7 and 8 as well as in the lateral members 14 and 15 make it possible to bring the wires to outlets 66.

The invention is hereby claimed as follows:

1. A seat structure useful for transportation vehicles and embodying at least two, side-by-side seats with back rests, and an arm rest pivotally mounted on said seat structure between said side-by-side seats for pivotal movement in a vertical plane between a normal, horizontal orientation of said arm rest and a retracted position with said arm rest disposed in a space between said side-by-side seats, said seat structure being characterized by an arm rest having a rear element and a forward element which is a prolongation of said rear element, said rear element having a width such that it will fit in the space between said seats and said forward element having an arm support surface of a width wider than said rear element and wider than said space between said seats and a depth such that said forward element will fit in said space between said seats, means pivotally mounting would rear element on said seat structure to effect said pivotal movement of said elements in unison between said normal, horizontal orientation of said arm rest and said retracted position in the space between said seats, and means for rotating said forward element with respect to said rear element through an angle of 90° about an axis extending longitudinally of said forward element between a first orientation of said arm support part wherein its width is in a horizontal plane and said arm support part can serve comfortably as an arm rest for both seats and a second orientation wherein said arm support surface is in a substantially vertical plane, whereby said forward element will fit in the space between said seats upon pivoting said arm rest to said retracted position.

2. A seat structure as claimed in claim 1, wherein the rear element is mounted on means providing a horizontal axis of rotation which is transverse to said vertical plane and the forward element is mounted for rotation on a longitudinal shaft.

3. A seat structure as claimed in claim 1 wherein said forward element includes a cam, one face of which at least when the arm rest is in normal position prior to its rotation with respect to said rear element presses against a lug member fixed to the seat structure, the contacting surfaces of said cam and said lug member being in a plane other than a vertical plane.

4. A seat structure as claimed in claim 3 wherein the contacting surfaces of said cam and said lug member are contained in a plane parallel with a transverse pivot shaft of said rear element and slanted relative to the vertical by an angle of approximately 20°.

5. A seat structure as claimed in claim 3 wherein the plane of the contacting surfaces of said cam and said lug member is a slanted plane, from top to bottom and from the rear to the front of the arm rest.

6. A seat structure as claimed in claim 3 wherein a small bridge on said rear element constitutes a stop member for said cam when the forward element of the arm rest pivots around its longitudinal axis by 90° relative to said rear element.

7. A seat structure as claimed in claim 1 wherein said means for rotating said forward element with respect to said rear element embodies pivot means providing pivotal movement of said forward element relative to said rearward element uniquely about a longitudinal axis through the arm rest.

8. A seat structure as claimed in claim 1 wherein the rear part of said forward element has a cylindrical pivot which cooperates with the cylindrical rim of a ring affixed to the forward part of said rear element.

9. A seat structure as claimed in claim 8 wherein a cam is mounted on said pivot in the rear of said ring, a washer being placed between the ring and the cam, movable in rotation relative to said ring.

10. A seat structure as claimed in claim 9 wherein said pivot is mounted on a mounting riveted to the rear part of said forward element and said ring is mounted on a mounting articulated on a transverse shaft between said seats.

11. A seat structure as claimed in claim 1 wherein said space between said seats is a space between the back rests of said seats in which said arm rest is accommodated in said retracted position.

12. A seat structure as claimed in claim 11 wherein said rear element is mounted on means providing a horizontal axis of rotation which is transverse to said vertical plane and located between said back rests.

* * * * *

UNITED STATES PATENT AND TRADEMARK OFFICE
CERTIFICATE OF CORRECTION

PATENT NO. : 4,052,103
DATED : October 4, 1977
INVENTOR(S) : Pierre T. Steinthal It is certified that error appears in the above-identified patent and that said Letters Patent are hereby corrected as shown below:

In Column 7, line 49, delete "... would ..." and substitute --... said ...--

Signed and Sealed this

Seventh Day of February 1978

[SEAL]

Attest:

RUTH C. MASON
Attesting Officer

LUTRELLE F. PARKER
Acting Commissioner of Patents and Trademarks